(12) United States Patent
Sczepczenski et al.

(10) Patent No.: US 11,194,648 B2
(45) Date of Patent: *Dec. 7, 2021

(54) DYNAMIC LOGGING AND PRIORITIZATION OF ERROR INCIDENT DATA

(71) Applicant: International Business Machines Corporation, Armonk, NY (US)

(72) Inventors: Richard Mark Sczepczenski, Hyde Park, NY (US); George Kuch, Poughkeepsie, NY (US); Daniel Hughes, Poughkeepsie, NY (US); Pascal Bastien, Poughkeepsie, NY (US); Luke Hopkins, Peterborough, NH (US); Mahmoud Amin, Poughkeepsie, NY (US); Dan Vangor, Mahopac, NY (US); Ying-Yeung Li, Pleasant Valley, NY (US); Myron Wisniewski, Catskill, NY (US); Margaret Frances Kaelin Dubowsky, Kingston, NY (US); Anmar A Al Zubaydi, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,980

(22) Filed: Feb. 22, 2021

(65) Prior Publication Data

US 2021/0173735 A1 Jun. 10, 2021

Related U.S. Application Data

(63) Continuation of application No. 16/565,619, filed on Sep. 10, 2019, now Pat. No. 11,010,230.

(51) Int. Cl.
*G06F 11/07* (2006.01)

(52) U.S. Cl.
CPC ...... *G06F 11/0775* (2013.01); *G06F 11/0751* (2013.01); *G06F 11/0787* (2013.01)

(58) Field of Classification Search
CPC ... G06F 11/0751; G06F 11/0775–0781; G06F 11/0787
See application file for complete search history.

(56) References Cited

U.S. PATENT DOCUMENTS

| 7,962,472 B2 * | 6/2011 | Erickson | G06F 11/0709 |
| | | | 707/713 |
| 8,719,641 B2 | 5/2014 | Cole | |

(Continued)

OTHER PUBLICATIONS

Mell et al., "The Nist Definition of Cloud Computing", Recommendations of the National Institute of Standards and Technology, Special Publication 800-145, Sep. 2011, 7 pages.

(Continued)

*Primary Examiner* — Joseph R Kudirka
(74) *Attorney, Agent, or Firm* — Cantor Colburn LLP; Steven Chiu

(57) ABSTRACT

Aspects of the invention include receiving an error code describing a computer hardware or firmware error. A list of data items to be collected to assist in correcting the error is received. The contents of the list are selected based at least in part on the error code and are in priority order. The data items in the list are collected and a buffer to store the collected data items is selected. At least a subset of the collected data items to be written is transmitted to the buffer. All of the collected data items are transmitted to the buffer when the buffer is large enough to hold all of the data items in the list. A subset of the collected data items are transmitted to the buffer in priority order when the buffer is not large enough to hold all of the data in the list.

20 Claims, 11 Drawing Sheets

(56) References Cited

U.S. PATENT DOCUMENTS

| | | |
|---|---|---|
| 9,075,773 B1 | 7/2015 | Rakitzis |
| 9,720,756 B2 | 8/2017 | Frolikov et al. |
| 2009/0089336 A1 | 4/2009 | Dewey |
| 2012/0150474 A1 | 6/2012 | Rentschler et al. |
| 2014/0013145 A1 | 1/2014 | Hopkins |
| 2016/0132382 A1 | 5/2016 | Frolikov et al. |

OTHER PUBLICATIONS

List of IBM Patents or Patent Applictions Treated as Related; (Appendix P), Filed Feb. 22, 2021, 2 pages.
Richard Mark Sczepczenski, et al., Pending U.S. Appl. No. 16/565,619 entitled "Dynamic Logging and Prioritization of Error Incident Data," filed Sep. 10, 2019.

* cited by examiner

DYNAMIC LOGGING AND PRIORITIZATION OF ERROR INCIDENT DATA

DOMESTIC PRIORITY

This application is a continuation of U.S. patent application Ser. No. 16/565,619, filed Sep. 10, 2019, the content of which is incorporated by reference herein in its entirety.

BACKGROUND

The present invention generally relates to logging data related to hardware or firmware errors, and more specifically, to dynamic logging and prioritization of error incident data.

When a computer system encounters a hardware or firmware error, data needs to be collected to analyze the nature of the error. This can be performed by collecting the relevant hardware and firmware stats. Once the data items are collected, a fixed size area of system memory, referred to as a log buffer, is used to store the data items for future analysis. Depending on the nature of the error, a variable amount of data may be required to be logged.

Errors in hardware and embedded firmware systems can require a variety of data for problem identification. The data required may be unique and dependent on content of hardware error registers. The system firmware can determine an error has occurred based, for example, on inconsistencies in control structures and/or contents hardware registers. The mechanisms a system can use to gather error data for subsequent analysis may be limited due to system constraints. For example, the time allotted to perform data collection may be limited due to timing requirements in real time systems. Another example is that the size of the incident data may be limited based on an amount of storage space available for the data.

SUMMARY

Embodiments of the present invention are directed to dynamic logging and prioritization of error incident data. A non-limiting example computer-implemented method includes receiving an error code describing a computer hardware or firmware error. A list of data items to be collected to assist in correcting the error is received. The contents of the list are selected based at least in part on the error code, and the contents of the list are in priority order from a highest priority data item to a lowest priority data item. The data items in the list are collected and a buffer to store the collected data items is selected. At least a subset of the collected data items to be written is transmitted to the buffer. All of the collected data items are transmitted to the buffer when the buffer is large enough to hold all of the data items in the list, and a subset of the collected data items are transmitted to the buffer in priority order starting with the highest priority data item when the buffer is not large enough to hold all of the data in the list.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
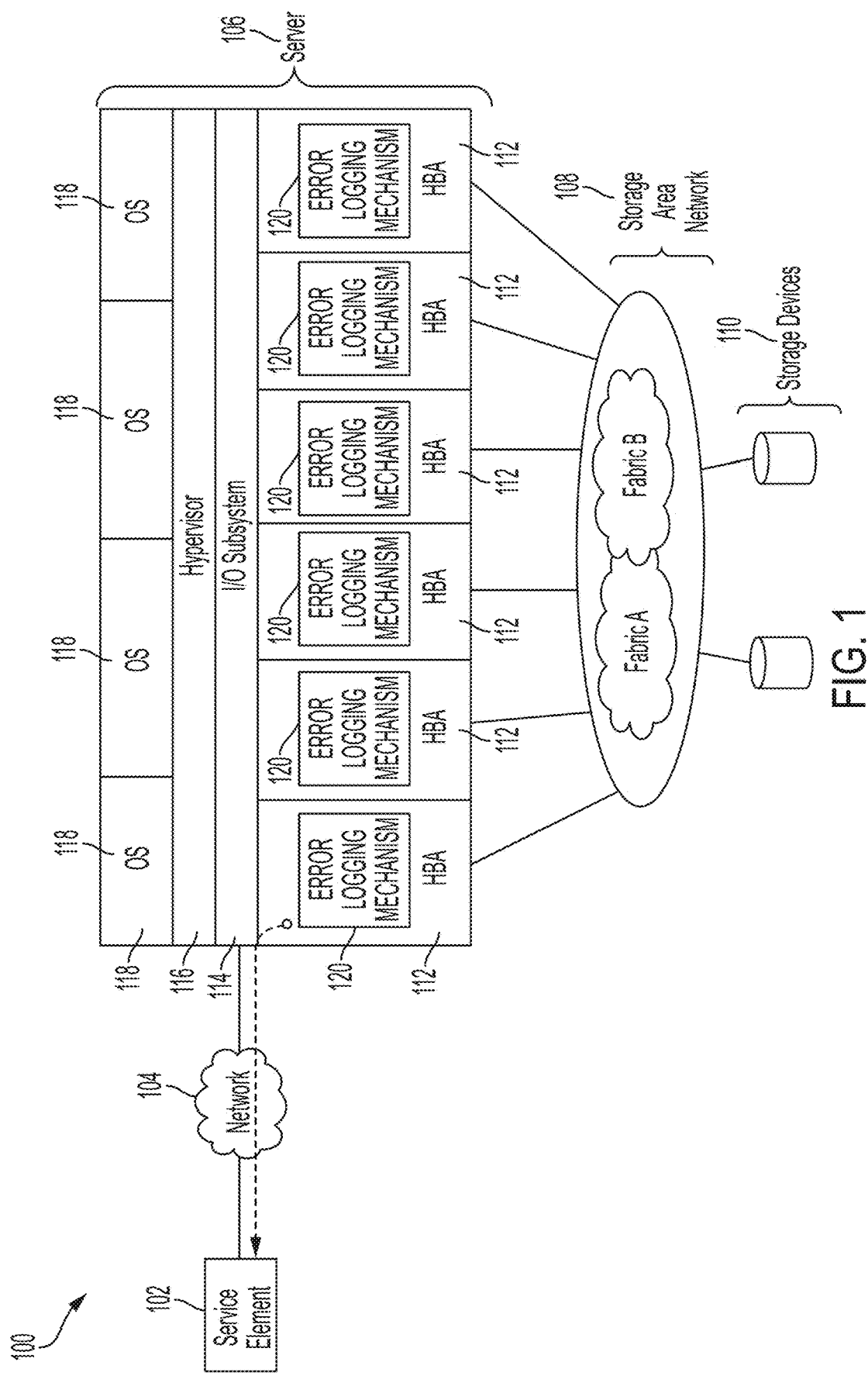
FIG. 1 depicts a system for dynamic logging and prioritization of error incident data in accordance with one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention provide an intelligent mechanism for collecting data for use in debugging hardware and firmware errors. The content of the data collected can be dynamically determined based on indicators presented by hardware registers and/or by code values provided by firmware. The error data collection is performed by dedicated firmware, referred to herein as an error logging mechanism that builds a prioritized linked list of elements, or data items, to be collected. The data items in the prioritized linked list can vary based on the nature of the error detected.

In accordance with one or more embodiments of the present invention, the error logging mechanism dynamically determines at the time of error detection what size buffer will be needed to store the collected data, or log data. Based on that decision, the error logging mechanism attempts to allocate a buffer from the appropriate buffer pool. If a large buffer in a pool of larger sized buffers is needed but cannot be allocated, the error logging mechanism attempts to allocate a log buffer from a pool of smaller sized buffers. When a buffer that is smaller than the determined size of the log data is used, some not all of the log data may be lost. One or more embodiments of the present invention address this by logging the highest priority data first. The log buffers in buffer pools that include log buffers of different sizes are referred to herein collectively as enhanced log buffers. If there are no enhanced log buffers available, the error logging mechanism defaults back to traditional logging methods.

In accordance with one or more embodiments of the present invention, the buffer pool is located on a system, referred to herein as a service element, remote from the error logging mechanism which is executing on a server. The error logging mechanism generates a log (also referred to herein as "collected data") that needs to be transferred to the service element, however in some cases the service element may not be able to process the log at the time that the error is detected and the log is generated. One or more embodiments of the present invention are capable of handling this issue by allowing the error logging mechanism to continue with log generation and eventually transfer all the logs that it has generated to the remote system in the correct order once the remote system (e.g., the service element) is ready to accept the pending logs.

Examples of hardware errors include, but are not limited to processor errors; first-in first-out (FIFO) errors; and Peripheral Component Interconnect Express (PCIe) errors. Examples of processor errors can include, but are not limited to: an attempt to execute an illegal instruction; an attempt to access a storage location that is unavailable; an attempt to access storage with an effective address alignment that is invalid for the instruction; and the execution of a defined instruction using an invalid form. Examples of FIFO error can include, but are not limited to: overflow errors, underflow errors, and read/write errors. An example of a PCIe error includes, but is not limited to reception of a fatal transaction layer packet (TLP). As known in the art, firmware refers to computer code that is programed into hardware components to control their operation and to provide an interface between an operating system and the hardware components. Examples of firmware errors include, but are not limited to: failed firmware state machine transitions; detection of inconsistencies in control block fields such as unknown/undefined values; and timeouts for process blocking commands (e.g., blocked threads waiting for an asynchronous process to complete which exceeds the allotted time, essentially a deadlocked thread).

One or more embodiments of the present invention provide technological improvements over current methods of logging error data that may limit the amount of data that may be collected when an error is detected and that may result in incomplete information about the error being collected. A disadvantage of contemporary approaches is that the information helpful for determining a cause of the detected error may not be captured. This can lead to extending the amount of time that it takes to discover a root cause of the detected error. One or more embodiments of the present invention provide technical solutions to one or more of these disadvantages by providing different sized log buffers that can be selected based on characteristics of the error that is detected. In this manner, more information can be collected and logged about particular errors (e.g., based on their error codes). One or more embodiments of the present invention also provide technical solutions to one or more of these disadvantages by collecting the data items to be logged in a prioritized order so that information thought to be most helpful to determining the root cause of an error is collected first. In this manner, if some of the information is not stored in a log buffer due, for example to a large enough log buffer not being available and/or to not enough time being available to capture all of the log data, the most important information is stored in the log buffer. This provides a higher likelihood that the data needed for determining the cause of the error is available in the log buffer for analysis.

One or more embodiments of the present invention provide technological improvements over current methods of logging error data that may collect large volumes of the same data items for every error. A disadvantage of contemporary methods is that the same data may not apply to every type of error and this can result in using computer resources to collect, transmit, and store unnecessary data. One or more embodiments of the present invention provide technical solutions to this disadvantage by dynamically varying the amount and type of data collected based on an error code(s) associated with the detected error. In this manner, when a particular error is detected, only data that is identified as being helpful to determine that cause of the particular error is collected. This can result in using fewer computer resources such as those used to collect and store the log data, or error data, and fewer network resources to transmit the error data. This can also result in better utilization of what may be a limited amount of log buffers in the service element. In addition, the order of importance of particular data items may be different for different error codes.

One or more embodiments of the present invention allow for logging information about an embedded system error in a way that is specific for that error. The highest importance data is stored first followed by additional data in descending priority order. This ensures that if necessary, only the least important data items are discarded.

One or more embodiments of the present invention also provide that data collection for different errors be unique and dynamically defined based on the type of error for more effective debugging of the error.

Turning now to FIG. 1, a system 100 for dynamic logging and prioritization of error incident data is generally shown in accordance with one or more embodiments of the present invention. In accordance with one or more embodiments of the present invention, all or a portion of the system 100 is located at a customer location. In accordance with one or more embodiments of the present invention, all or a portion of the system 100 is located in a cloud computing environment.

The system 100 shown in FIG. 1 includes a service element 102, a network 104, a server 106, a storage area network (SAN) 108, and storage devices 110. In accordance with one or more embodiments of the present invention, the server 106 includes a hypervisor 116 for executing multiple operating systems (OSs) 118. The server may be implemented by any computer server known in the art such as, but not limited to, an IBM® System Z®. The hypervisor 116 interacts with an input/output (I/O) subsystem 114 to access data on the storage devices 110 via host bus adapters (HBAs)

112 and the SAN 108. As shown in FIG. 1, each HBA 112 includes an error logging mechanism 120 that collects error data when an error is detecting during an access to one of the storage devices 110. In accordance with one or more embodiments of the present invention, the service element 102 includes buffers for storing error data collected by the error logging mechanism 120. The data stored in the service element 102 can be used by the customer and/or sent to a computer or service provider to debug errors that are detected in the system 100. The network 104 can be implemented by any wired or wireless network known in the art such as, but not limited to: an Ethernet network and a network in a cloud computing environment.

In accordance with one or more embodiments of the present invention, the error logging mechanism 120 is part of an embedded system located in each HBA 112 for detecting and correcting firmware and hardware errors. As known in the art, each embedded system can include application specific hardware such as a hardware state machine and firmware for controlling the hardware state machines in real time.

The hardware state machines may have dedicated hardware for checking for valid state transitions. In addition the data paths within the hardware may have error checking including, but not limited to, parity checking and error correction code support to ensure the integrity of the data flowing through the system. If the hardware state machine detects an error, it may be able to correct it without interaction with the firmware. In this case, statistics may be kept and the firmware may be made aware only upon request or when some threshold is reached. Alternatively, the nature of the error may be such that the hardware state machines may have to stop processing and alert the firmware for recovery actions. In such a condition, there may be a large amount of information that can be collected from the hardware. The actual amount of information that is collected can be limited by resources available to perform the logging as well as the time allotted to perform the logging.

The firmware of the embedded systems can also check for consistency in control structures. These control structures may be manipulated by the firmware, the hardware, and possibly entities outside of the embedded system. An indication can be developed by the firmware as to the nature of the error and the nature of the error can be summarized by the firmware as a bit vector reason code.

For both errors detected by the hardware and errors detected by the firmware, vast amounts of state information can be available for logging and it is not feasible to collect all of the available state information due to, for example, system constraints for time and an amount of stored required to collect all the state information.

In accordance with one or more embodiments of the present invention, a mechanism, such as error logging mechanism 120, is provided to dynamically determine the data to log for optimal problem identification. In the case of hardware detected errors, the process performed by the error logging mechanism 120 begins by collecting the data summarized in a hardware error register(s). In the case of firmware errors, the process performed by the error logging mechanism 120 begins with a firmware error reason code. In both cases these indicators (the data summarized in a hardware register(s) and the error reason code) are treated as searchable values and are referred to herein collectively as error codes. These error codes are values stored in a logging reference table such as that shown below with reference to FIG. 3.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, programs, functional blocks, connections between functional blocks, modules, inputs, outputs, etc.). For example, all or a portion of the error logging mechanism 120 can be located in the I/O subsystem 114, in the hypervisor 116, and/or in an error detection mechanism in the HBA 112. Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
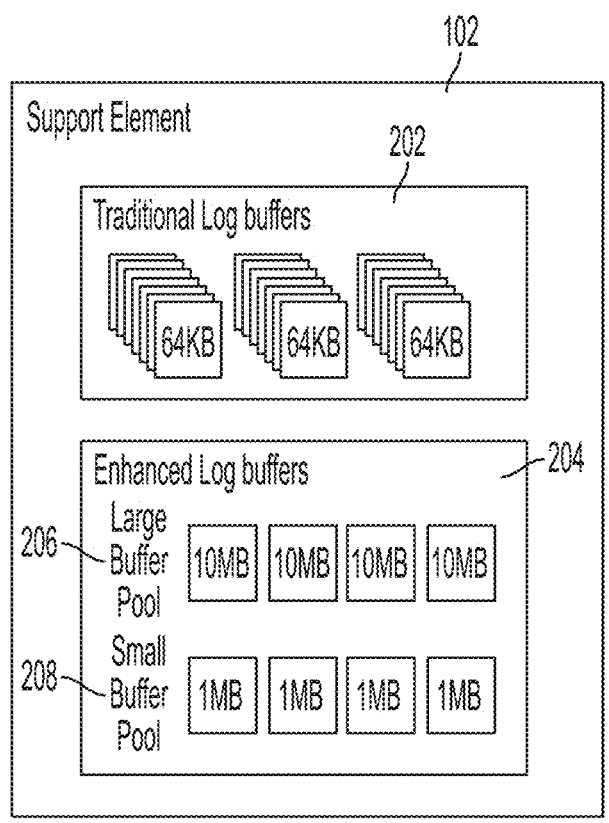
FIG. 2 depicts a service element containing log buffers in accordance with one or more embodiments of the present invention.

Turning now to FIG. 2, a service element 102 containing log buffers is generally shown in accordance with one or more embodiments of the present invention. The service element 102 shown in FIG. 2 includes traditional log buffers 202 and enhanced log buffers 204. Traditional logging, which includes the use of traditional log buffers 202, can be used as a backup or instead of enhanced logging, which uses enhanced log buffers 204, for example, when there are no more enhanced log buffers 204 available for storing log data or when enhanced logging is otherwise not available.

Contemporary logging approaches for detected hardware and firmware errors, referred to herein as traditional logging, typically utilize a variable number of relatively small sized (e.g., 64 kilobytes (KB)) log buffers. The variable number of log buffers is typically capped (e.g., at 5, 7, or 10). Thus, only a limited amount of data can be stored about each error due to the limited amount of space in the traditional log buffers 202. In accordance with one or more embodiments of the present invention, by prioritizing the data collection, the data items thought to be most important to debugging a particular error can be stored in the limited amount of space in the traditional log buffers 202.

Also shown in FIG. 2, are the enhanced log buffers 204 which can be used by the enhanced logging performed by one or more embodiments of the error logging mechanism described herein. The enhanced log buffers 204 shown in FIG. 2 include a large buffer pool 206 shown as being ten megabytes (MBs) in size and a small buffer pool 208 shown in FIG. 2 as being one MB is size. Whether a buffer is selected from the large buffer pool 206 or the small buffer pool 208 depends, for example, on the amount of log data that is collected for a particular error as well as availability of the buffers.

Two sizes of log buffers are shown in FIG. 2 for ease of description, one skilled in the art will appreciate that any number (3, 10, 100, etc.) of sizes of buffers can be implemented using one more embodiments of the present invention. The small buffer pool 208 is not limited to having buffers sized at 1 MB nor is the large buffer pool 206 limited to having buffers sized at 10 MB as these sizes are shown in FIG. 2 as examples only. In addition to log buffers, other elements (e.g., processors, network interfaces, etc.) may also be included in the storage element 102.

Figure 3:
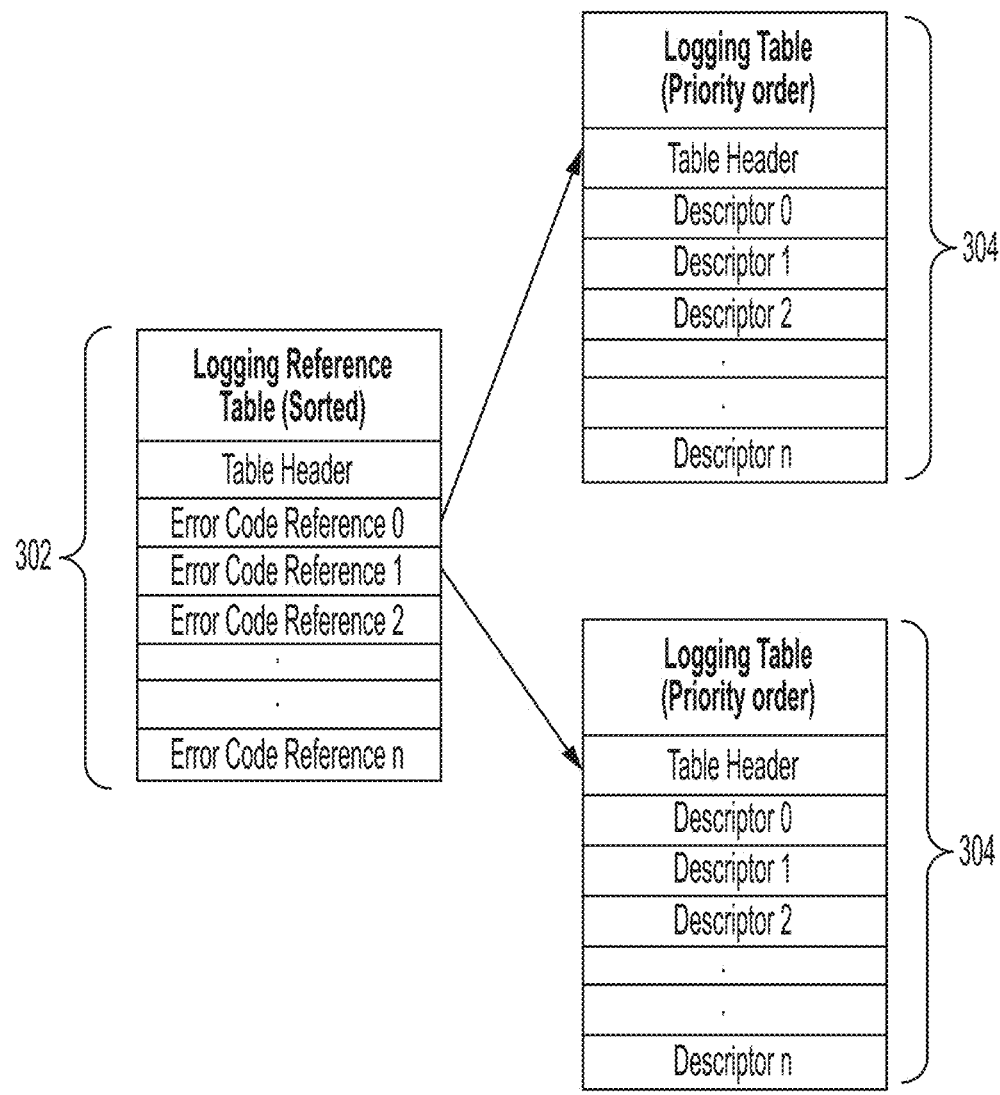
FIG. 3 depicts a block diagram that includes a logging reference table and logging tables in accordance with one or more embodiments of the present invention.

Turning now to FIG. 3, block diagram 300 that includes a logging reference table and logging tables is generally shown in accordance with one or more embodiments of the present invention. In accordance with one or more embodiments of the present invention, the logging reference table 302 and the logging tables 304 are stored in memory located on a HBA, such as HBA 112 of FIG. 1.

Figure 4:
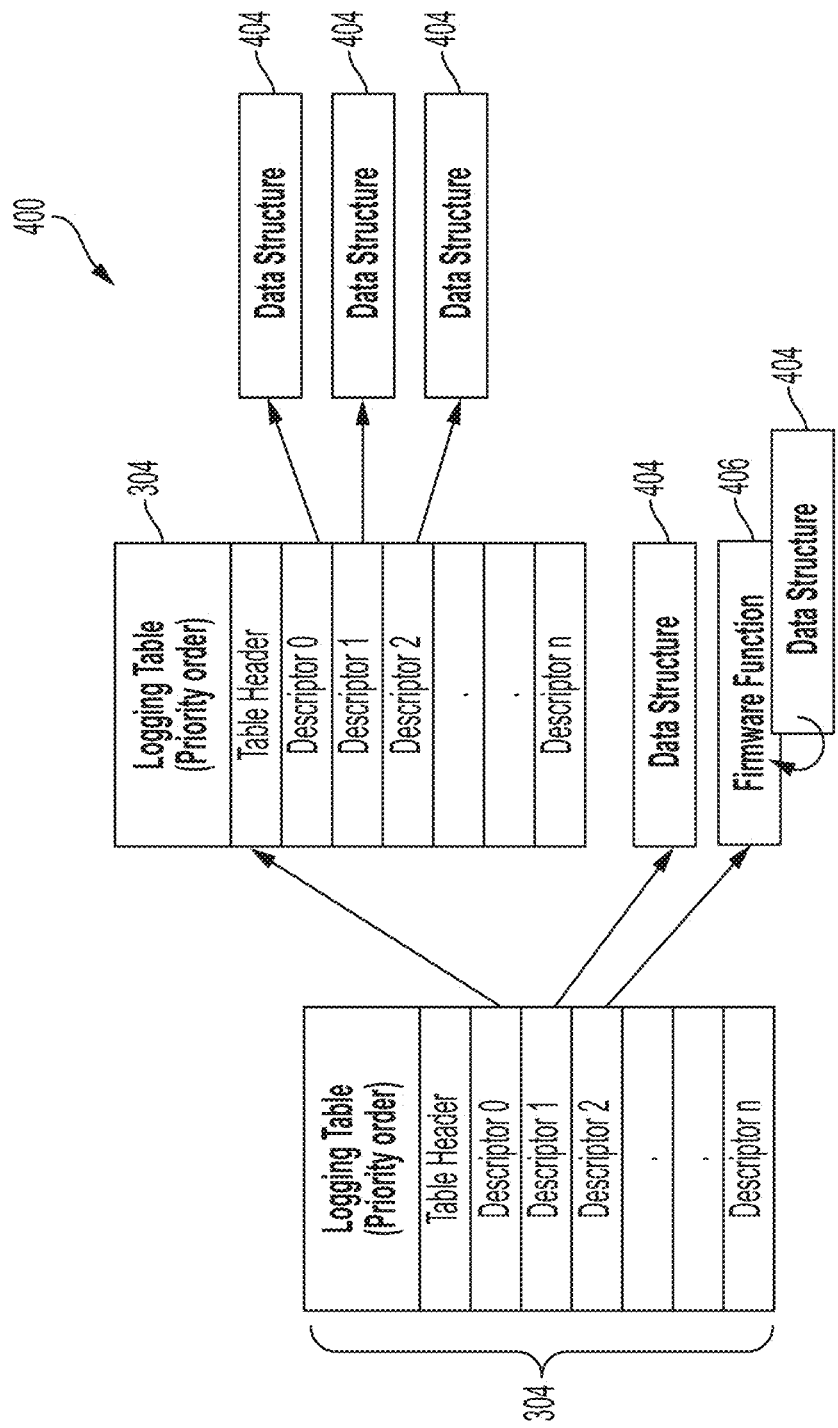
FIG. 4 depicts a block diagram that includes logging tables, data structures, and a firmware function in accordance with one or more embodiments of the present invention.

Upon receipt by the error logging mechanism 120 of an error code from error detection and/or correction software being executed for example, by HBA 112 of FIG. 1, the error logging mechanism 120 performs a binary search to find the received error code in the logging reference table 302. The logging reference table 302 includes error code references for at least a subset of the error codes that can be generated for hardware and/or firmware errors. In addition, the logging reference table 302 can include a default error code reference for use when an error that has an error code not located in the logging reference table 302 in received by the error logging mechanism 120. As shown in FIG. 3, the logging reference table 302 has a table header and is sorted or indexed by error code for easy access. In accordance with one or more embodiments of the present invention, the table header of the logging reference table 302 includes an ASCII name for the table and the length of the table, as well as an optional pad field so that the size of the table remains on a four byte boundary, As shown in FIG. 3, each error code reference element in the logging reference table 302 includes an error code (e.g., a sixteen bit value representing the error code) and a pointer to a logging table 304 that includes entries that are in priority order. In accordance with one or more embodiments of the present invention the pointer includes an address (e.g., a 64 bit address) of a logging table 304. As shown in FIG. 3, each of the entries in a logging table 304 includes a descriptor. In accordance with one or more embodiments, the present invention, the table header of a logging table 304 includes an ASCII name for the table and the length of the table, as well as an optional pad field so that the size of the table remains on a four byte boundary, Turning now to FIG. 4, a block diagram 400 that includes logging tables, data structures, and a firmware function in accordance with one or more embodiments of the present invention. As shown in FIG. 4, each of the descriptors in a logging table 304 can point to another logging table, a data structure 404, or a firmware function 406 that returns a data structure 404 or another logging table. In accordance with one or more embodiments of the present invention, each data structure 404 specifies an address to collect a data item(s) from and an amount of data to collect (e.g., a number of bytes to read starting at the address).

In accordance with one or more embodiments of the present invention, upon presentation of an error code to the error logging mechanism 120, a binary search is performed to find the received error code in the logging reference table 302. Each error code refers to a logging table 304 which is used to build a list of data structures to be logged as a result of the error corresponding to the error code. The logging table 304 contains a list of descriptors that point to: another logging table 304, a data structure 404, or a firmware function 406 which returns a data structure 404. The descriptors of the data items in the logging table 304 are in priority order from highest priority at the start of the logging table 304 to lowest priority at the end of the logging table 304. When a descriptor points to another logging table 304, the logging table 304 being pointed to and its descriptors will be processed before the next descriptor in the current logging table 304. If the descriptor points to a firmware function 406, the error logging mechanism 120 invokes the firmware function 406. A firmware function 406 can be invoked to inspect control blocks and/or hardware registers for more detailed identification of priority data to be logged.

An example of a firmware function 406 that can be invoked includes, but is not limited to a function that logs fibre channel request blocks (FCRBs). The HBA has over 800 such control blocks which are used for thread locking and flow control. This example firmware function can inspect the HBA blocks to locate those which are in use and log them.

Another example of a firmware function 406 is a function that is passes a particular operation's unique identifier (these are assigned by the host OS and passed down to the HBA to uniquely identify requests). The function will scan through several pools of control blocks looking for control blocks associated with the particular operation's unique identifier. Specifically, the control block from the OS is referred to as a queue transfer control block (QTCB) and it contains the unique identifier. Each QTCB will have one or more associated FCRB's and each FCRB may be associated with one or more I/O control blocks (IOCB's). The IOCB's have many purposes including executing small computer system interface (SCSI) block commands to storage devices or transmitting link service requests on the fibre channel link. This example firmware function will locate all control blocks associated with a particular QTCB and log them together for efficient debugging.

The logging tables 304 are tailored to capture the highest priority data items for a given error. When the logging code is invoked by a firmware or hardware error (e.g., by the error logging mechanism 120 receiving an error code), the first logging table 304 is located via searching the logging reference table 302. The error logging mechanism 120 processes the logging table 304 by starting at the first descriptor entry at the top of the logging table 304. This is the highest priority data. Each descriptor is processed in order from the top of the logging table 304 to the bottom of the logging table 304, following pointers to additional logging tables 304 when specified by the descriptor. The result is a linked list of pointers to data structures as shown in FIG. 5.

Figure 5:
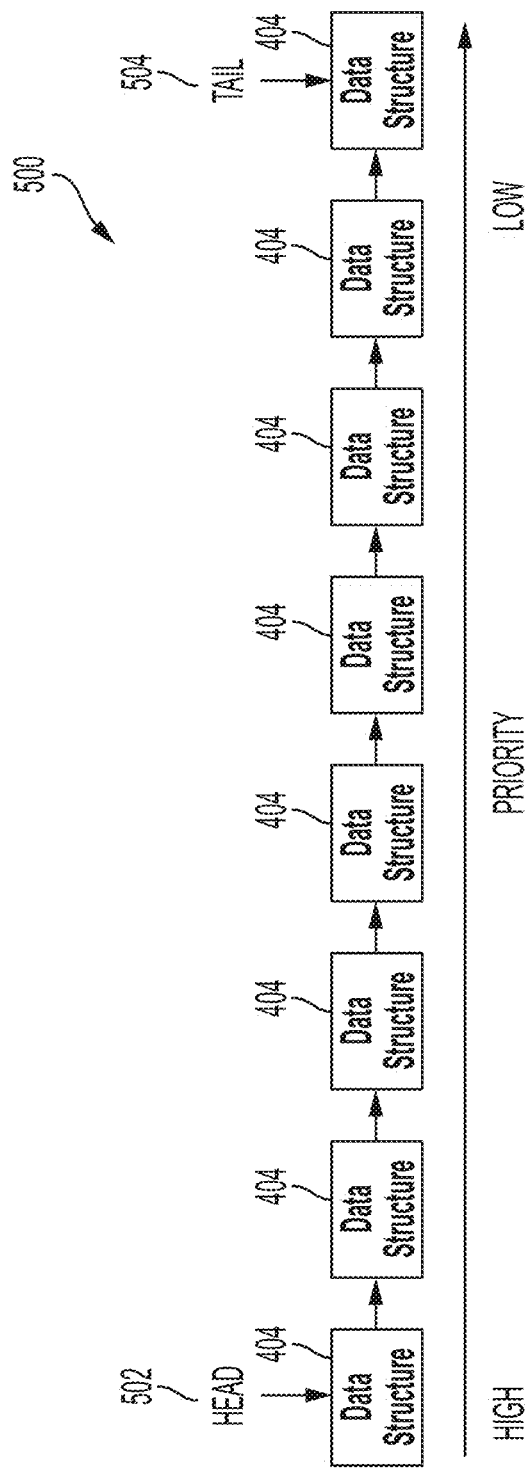
FIG. 5 depicts a linked list of data structures in accordance with one or more embodiments of the present invention.

Turning now to FIG. 5, a linked list 500 of data structures 404 is generally shown in accordance with one or more embodiments of the present invention. The linked list 500 shown in FIG. 5 and constructed as described above represents an error code specific list of data items to log. The data items to be logged are prioritized from highest importance relative to this error code, to lowest. In accordance with one or more embodiments of the present invention, the error logging mechanism 120 processes the linked list 500 shown in FIG. 5 in order starting with the head 502 of the linked list 500 and ending at the tail 504 of the linked list. The head 402 of the linked list 500 is processed first because it contains the highest priority information, or data item, for debugging the error represented by the error code. In accordance with one or more embodiments of the present invention, each data structure 404 specified in a list entry may include an address/length pair. In accordance with one or more embodiments the linked list element includes a 64 bit address and 4 byte length. The address/length pair in each data structure 404 is used to identify the starting location of data to be logged and an amount of data to be logged. In accordance with one or more embodiments of the present invention, the data pointed to by the entry must be contiguous in memory.

In accordance with one or more embodiments of the present invention, the error logging mechanism 120 is aware of the size constraint for logging and if it determines there is a chance that the allocated space in the service element 102 may be overrun, it will stop processing the linked list 500. Because the data is collected in priority order, the most important data is collected by one or more embodiments of the present invention before the error logging mechanism 120 stops collecting error data.

Figure 6:
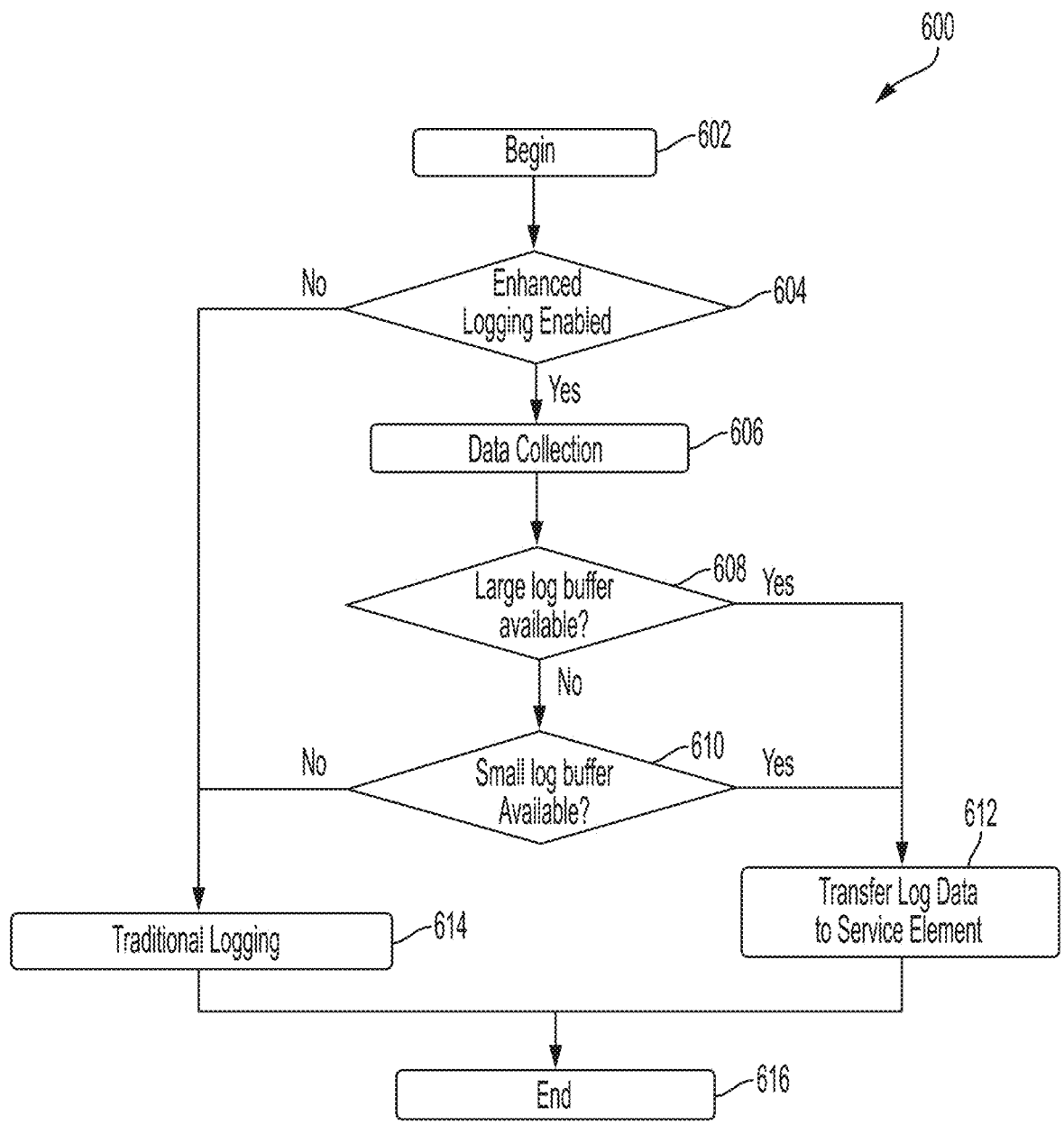
FIG. 6 depicts a process flow diagram of dynamic logging and prioritization of error incident data in accordance with one or more embodiments of the present invention.

Turning now to FIG. 6, a process flow diagram 600 of dynamic logging and prioritization of error incident data is generally shown in accordance with one or more embodiments of the present invention. All or a portion of the processing shown in FIG. 6 can be implemented by the error logging mechanism 120 of FIG. 1. At block 602, an error code is received indicating that an error has occurred on the system (e.g., server 106 of FIG. 1). When an error occurs on the system, log data needs to be collected for problem analysis. At block 604, a check is made to determine if enhanced logging is enabled. If enhanced logging is not enabled, then processing continues at block 614 with traditional logging being performed and processing ends at block 616.

In accordance with one or more embodiments of the present invention, traditional logging includes building seven independent lists of data structures which will each fit into a 64 KB buffer. The data is fixed and the elements of the list are in no particular order. There is no dynamic aspect to data collected or priorities assigned for traditional logging. The logging code will construct the same list of data to be logged for every type of error whether it be hardware or firmware detected. In addition, there is no queueing aspect to traditional logging, if there are no resources available the 64 KB log buffers will be discarded resulting in loss of data.

The processing at block 604 can also include checking the error code to determine whether the error type specifically requires traditional logging. If the error type specifically requires traditional logging then processing continues at block 614 and then at block 616. An example of an error code that may require traditional logging includes, but is not limited to a failed recovery scenario such as the following. When an error occurs and enhanced logging is enabled, that is the path that is taken. The system goes through the normal path of enhanced logging which collects the data and attempts to transfer the data to the service element 102. After that process completes, the HBA is then reset by the I/O subsystem. Ordinarily, the HBA hardware will reset successfully allowing firmware to initialize and indicate readiness to the I/O subsystem. If the initialization takes longer than a pre-selected period of time (e.g., 300 milliseconds (ms), 500 ms, 1,000 ms, etc.) the I/O subsystem assumes the HBA has encountered a potentially unrecoverable error and will invoke recovery by writing a hardware register on the HBA. When the logging mechanism encounters this error it will force traditional logging as it is typically the safest way to collect data when an HBA potentially has hardware problems.

If it is determined at block 604 that enhanced logging is enabled and/or optionally that the error code can be processed by the enhanced logging, processing continues at block 606 with performing data collection. In accordance with one or more embodiments of the present invention, as described previously, the error code is looked up in a reference table, such as logging reference table 302 of FIG. 3, to generate a linked list of data items to be collected and a priority order for collecting the data items. At block 608 it is determined if a log buffer large enough to accommodate all of the error data that was collected (also referred to herein as a log) is available. In the example shown in FIG. 6, where only two sizes of log buffers are available (large and small as show in FIG. 2) for use by the enhanced logging process, a large buffer is required to hold all of the error data that was collected at block 606. The determining at block 608 can include attempting to lock a large buffer. If the attempt at locking the large buffer is successful, then the large buffer is available, otherwise if the lock attempt is not successful, a large buffer is not available.

Based on determining, at block 608, that a large buffer in the enhanced log buffers is available, processing continues at block 612 with transferring the collected data items, or log data, to the large buffer that was locked in block 608. The large buffer can be located remotely from the system on a service element, such as service element 102 of FIG. 1.

Based on determining, at block 608, that a large buffer in the enhanced log buffers is not available, processing continues at block 610 to determine whether a small buffer (e.g., a buffer that will not hold all of the error data that was collected at block 606 is available. The determining at block 610 can include attempting to lock a small buffer. If the lock is successful, the small buffer is available. Based on determining that a small buffer is available, processing continues at block 612 with transferring the collected data items, or log data, to the small buffer (e.g., located on a service element) that was locked in block 610.

Based on determining that a small block in the enhanced log buffers is not available, processing continues at block 614 with performing traditional logging. In accordance with one or more embodiments, where the traditional log buffers 202 will only be able to store a subset of the data items collected at block 606, the higher priority data collected at block 606 is stored in the traditional log buffers 202. Thus, the traditional logging performed at block 614 is improved by logging the data items deemed to be most important to the particular error code in the traditional log buffers 202.

In accordance with one or more embodiments of the present invention, the enhanced log buffers include a series of buffer pools. Each enhanced log buffer pool includes a plurality of equal sized buffers. The buffer pools are numbered "1" through "N" where buffer pool 1 contains the smallest sized buffers and N (which can be larger than two) contains the largest sized buffers. Due to system constraints, buffer pool N may contain the least number of buffers and the buffer pool 1 the most number of buffers.

When an error occurs and the log data is defined (e.g., data items are collected), the system attempts to allocate the smallest sized buffer capable of storing the collected error data. In accordance with one or more embodiments of the present invention, the size values can be predetermined for each error code. The system then tries to allocate a buffer from the appropriate buffer pool. If a buffer from that pool is available, the system proceeds to use it to log the error data items. If not, the system attempts to select a buffer from the next pool of smaller buffers, and then checks again for availability. It repeats this process until a buffer is found. Note that using a smaller buffer than originally desired will result in some log data truncation. If the system has gone through all the buffer sizes from all the pools but still can't find any buffer available, it defaults to the traditional logging methods.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

One or more embodiments of the present invention include methods of transferring the logs, or collected data, to a remote system, such as service element 102 of FIG. 1. In accordance with one or more embodiments of the present invention, there is a queue for the logs, or collected data items, as they are generated. If the remote system (e.g. the service element) is able to accept the log at the time it is generated, the log is transferred immediately. If the remote system is busy or out of resources and cannot accept the log, the log can then be queued on the local system and transferred at a later time. If another log is generated while logs are currently queued for transfer, the log can be queued immediately without checking the state of the remote system to preserve the order of the log transfers. In accordance with one or more embodiments of the present invention, a separate process is initiated outside of logging events to handle transferring logs to the remote system when it is ready to accept the logs. The process can begin by periodically polling the remote system to determine when it is ready to receive logs. The logs are then transferred to the remote system in order of their creation.

Figure 7:
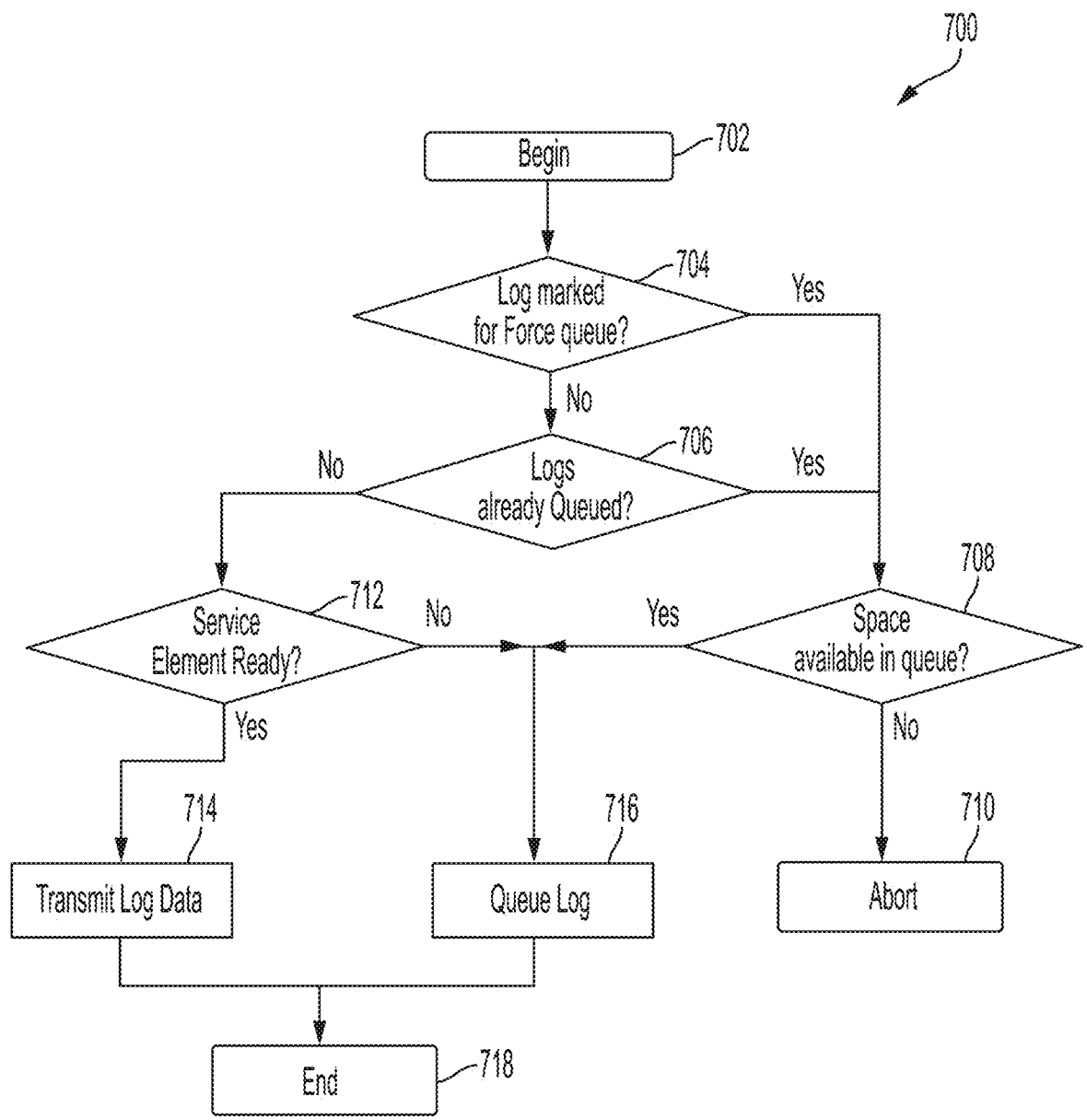
FIG. 7 depicts a process flow diagram of transferring log data to a service element in accordance with one or more embodiments of the present invention.

Turning now to FIG. 7, a process flow diagram 700 of transferring log data to a service element is generally shown in accordance with one or more embodiments of the present invention. All or a portion of the processing shown in FIG. 7 can be implemented by the error logging mechanism 120 of FIG. 1. Processing beings at block 702 when error data has been collected and is ready to be written to a buffer (e.g., an enhanced log buffer 204 of FIG. 2). The local system (e.g., server 106 of FIG. 1) has the ability to transfer a log to a remote system (e.g., service element 102 of FIG. 1) immediately or at a later time. At block 704, a check is made to see if the log (or the collected data) is marked as "force queue." The local system has the ability to mark a log for unconditional queuing. This results in skipping the check at block 706 to determine if the queue is empty. The ability to mark a log for unconditional queueing can allow for debugging utilities and flexibility in how the logs are handled. If the log is marked as force queue, as determined at block 704, processing continues at block 708 with determining whether space is available in the queue. If no space is available in the queue, the log generation processing aborts. If, as determined at block 708, there is space available in the queue, the log, or collected data items, is stored in the queue at block 716 and the processing ends at block 718.

At block 706, a check is made to determine whether there are logs that are already queued and waiting to be transferred. If there are none, then the process proceeds at block 712 to determine if the service element is ready to accept the collected data. In accordance with one or more embodiments of the present invention, the error logging mechanism contacts the remote system to see if it is able to receive the log. If it is, processing continues at block 714 and the log, or collected data, is transmitted to the remote system and processing completes at block 718. If it is determined, at block 712, that the remote system is not available (e.g., due to being busy or out of resources), then processing continues at block 716 and the log is stored in the queue. No checking for space on the queue is needed at this point as the queue was already identified as being empty at block 706. Processing completes at block 718.

As shown in FIG. 7, when a logging event is initiated at block 702 and the local system (e.g., error logging mechanism 120) has determined at block 706 that there are currently logs in the queue, it will attempt to queue the new log at block 716. This process can be used to maintain the order of the logs being transferred to the remote system. The local system then checks if it as room in the queue for the log. If there is room, as determined at block 708, the log is then queued. If there is no room, the log has nowhere to be placed and the local system aborts the log generation at block 710 and can signal that a failure to store the log has occurred.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8:
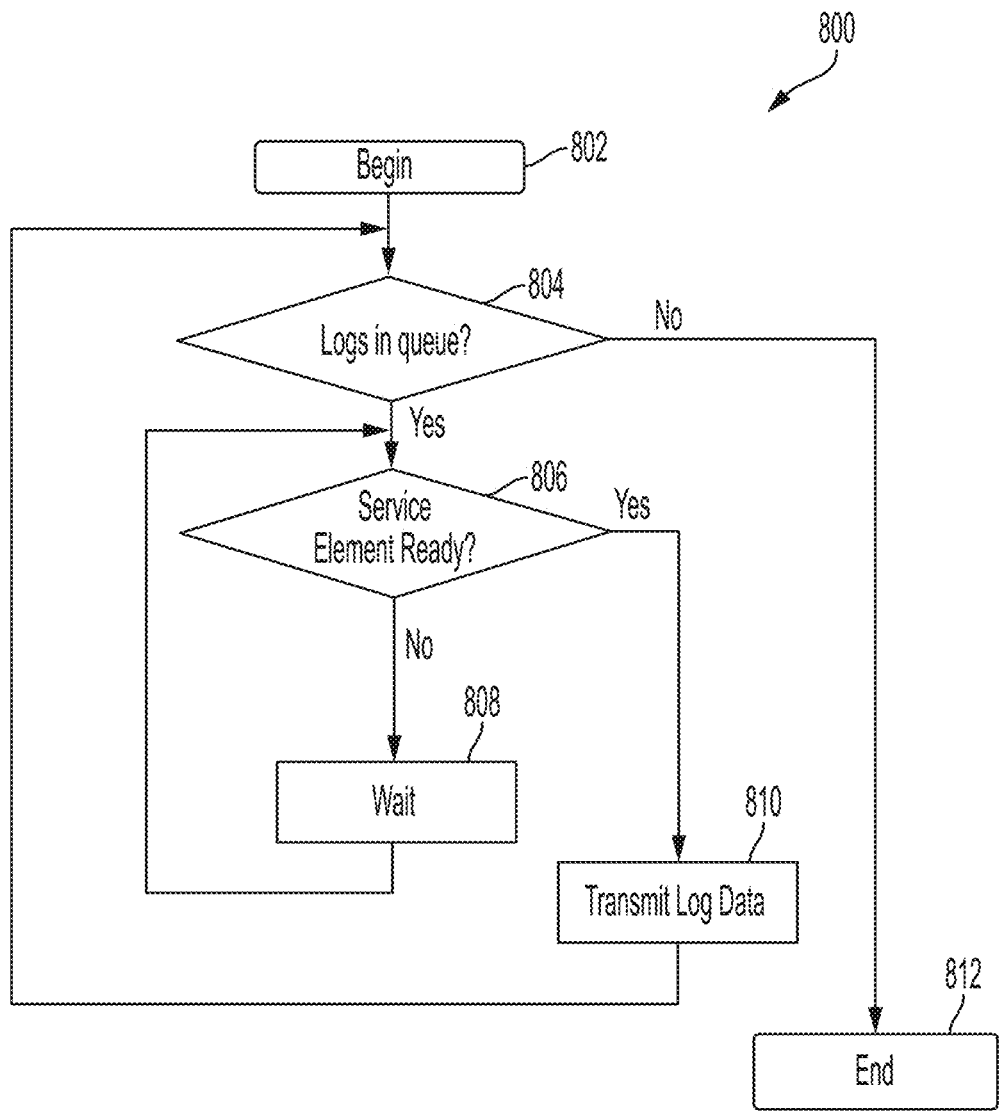
FIG. 8 depicts a process flow diagram of post processing queued log entries in accordance with one or more embodiments of the present invention.

Turning now to FIG. 8, a method 800 of post processing queued log entries is generally shown in accordance with one or more embodiments of the present invention. All or a portion of the processing shown in FIG. 8 can be implemented by the error logging mechanism 120 of FIG. 1.

Once the logging event is finished, the local system begins the queued log transfer process at block 802. The local system first determines, at block 804, if there are any logs in the queue. If there are no logs queued, the process ends at block 812. If it is determined at block 804 that there are logs in the queue, the local system checks, at block 806, to see if the remote system is ready to handle the transfer of a queued log. If the remote system is not ready, then processing continues at block 808 with the local system going into a wait period. Once the wait period is over, the local system checks again at block 806 to see if the remote system is ready for a log transfer. When, as determined at block 806, the remote system is ready for a log transfer, processing continues at block 810 with the local system transferring the oldest log in the queue to the remote system. After the transfer is complete, the local system begins the processing again at block 804 with determining if there are any other logs in the log queue. Once all the logs have been transferred to the remote system, the process completes at block 812.

The process flow diagram of FIG. 8 is not intended to indicate that the operations of the method 800 are to be executed in any particular order, or that all of the operations of the method 800 are to be included in every case. Additionally, the method 800 can include any suitable number of additional operations.

One or more embodiments of the present invention provide an intelligent mechanism for collecting data for the debug of hardware and firmware errors. The content of the data collected is dynamically determined based on indicators presented by hardware registers and/or code values provided by the firmware. In accordance with one or more embodiments of the present invention, the error data collection is done by dedicated firmware that builds a prioritized linked list of elements to be collected. This list is specific for the nature of the error detected. In addition, one or more embodiments of the present invention provide a mechanism to dynamically determine at the time of the error being detected what size buffer will be needed. Based on that decision, the system can attempt to allocate a buffer from the appropriate buffer pool. If one cannot be allocated, the system attempts to allocate from a pool of smaller size buffers. Using this smaller buffer, some but not all of the log data may be lost. For this reason, highest priority data are logged first. If none of these buffers are available, the system can default back to a traditional logging method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
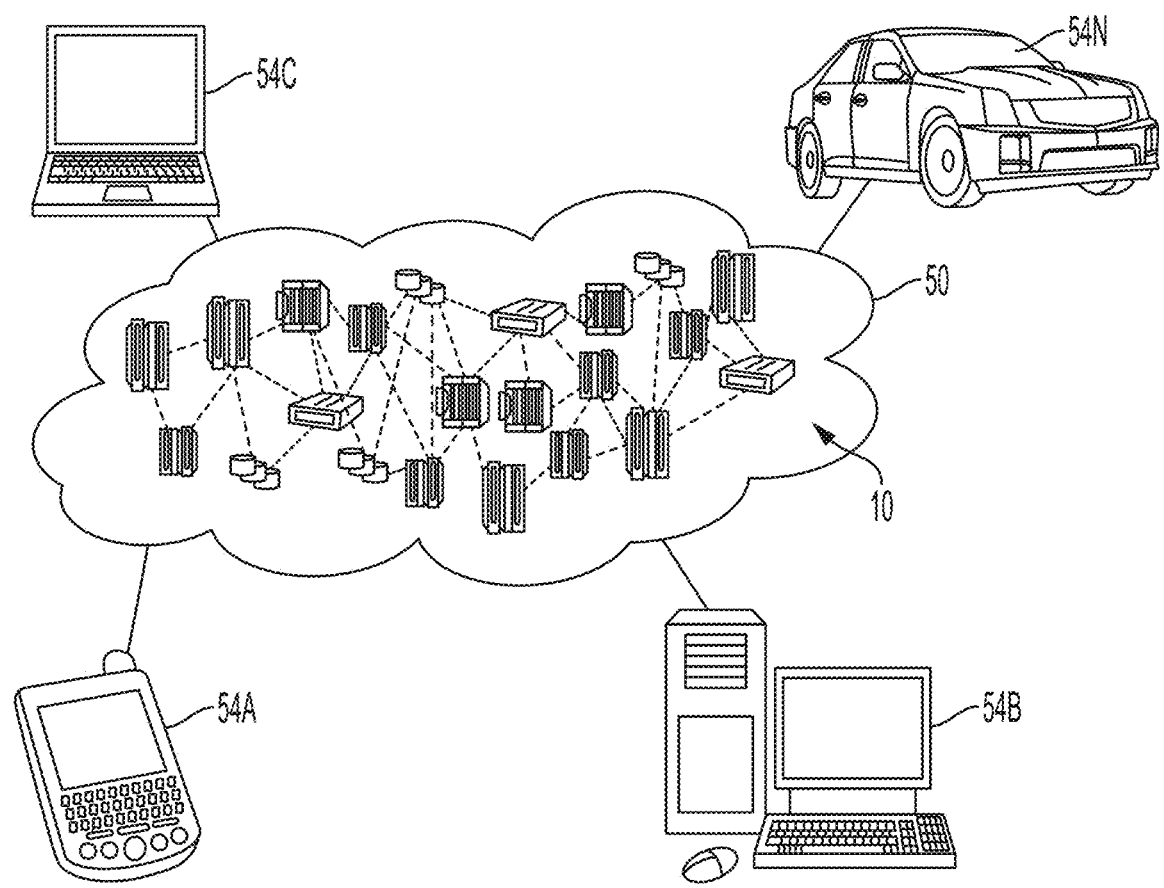
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
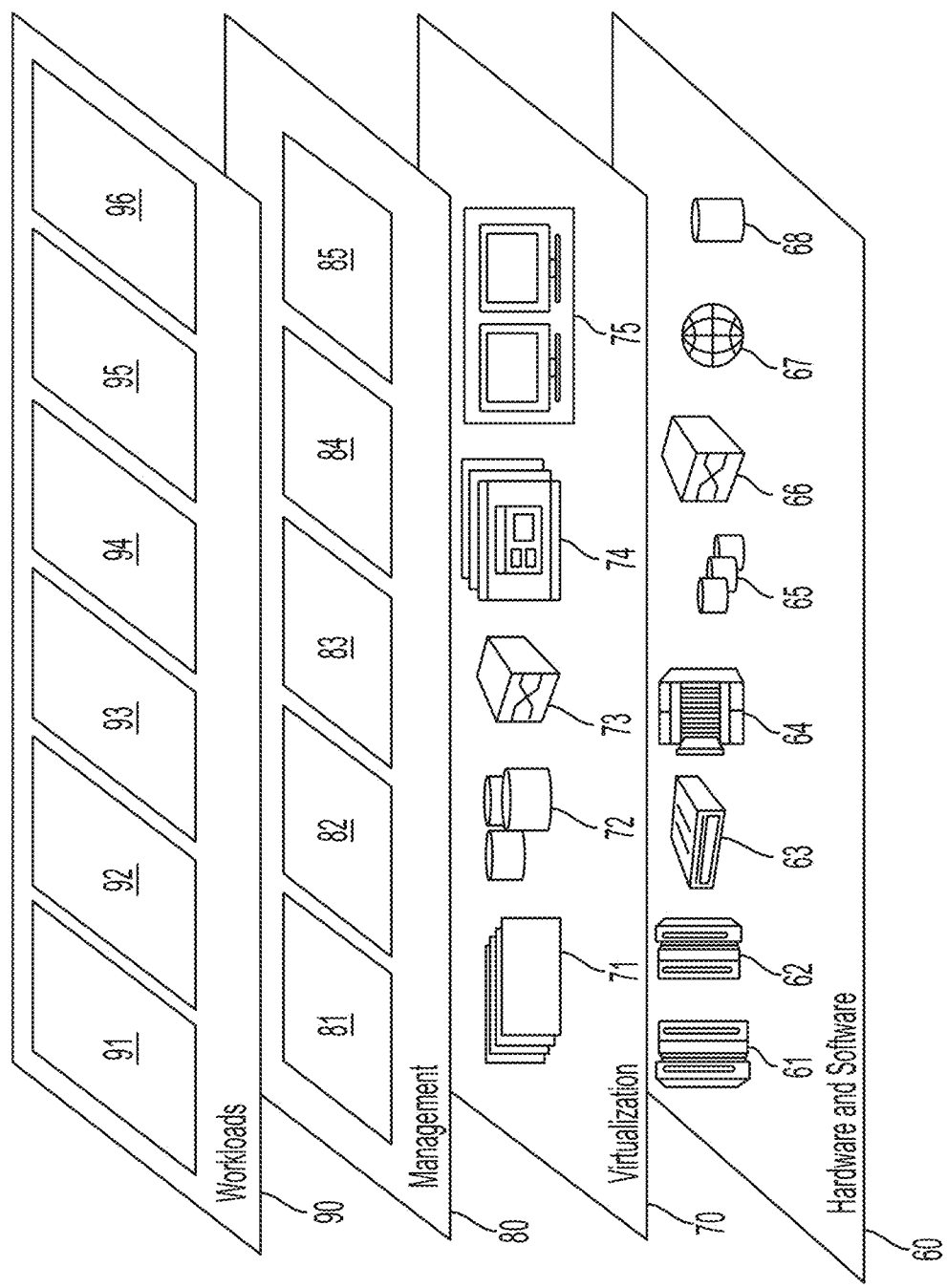
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hardware and firmware error data collection and logging 96.

It is understood that one or more embodiments of the present invention are capable of being implemented in conjunction with any type of computing environment now known or later developed.

Figure 11:
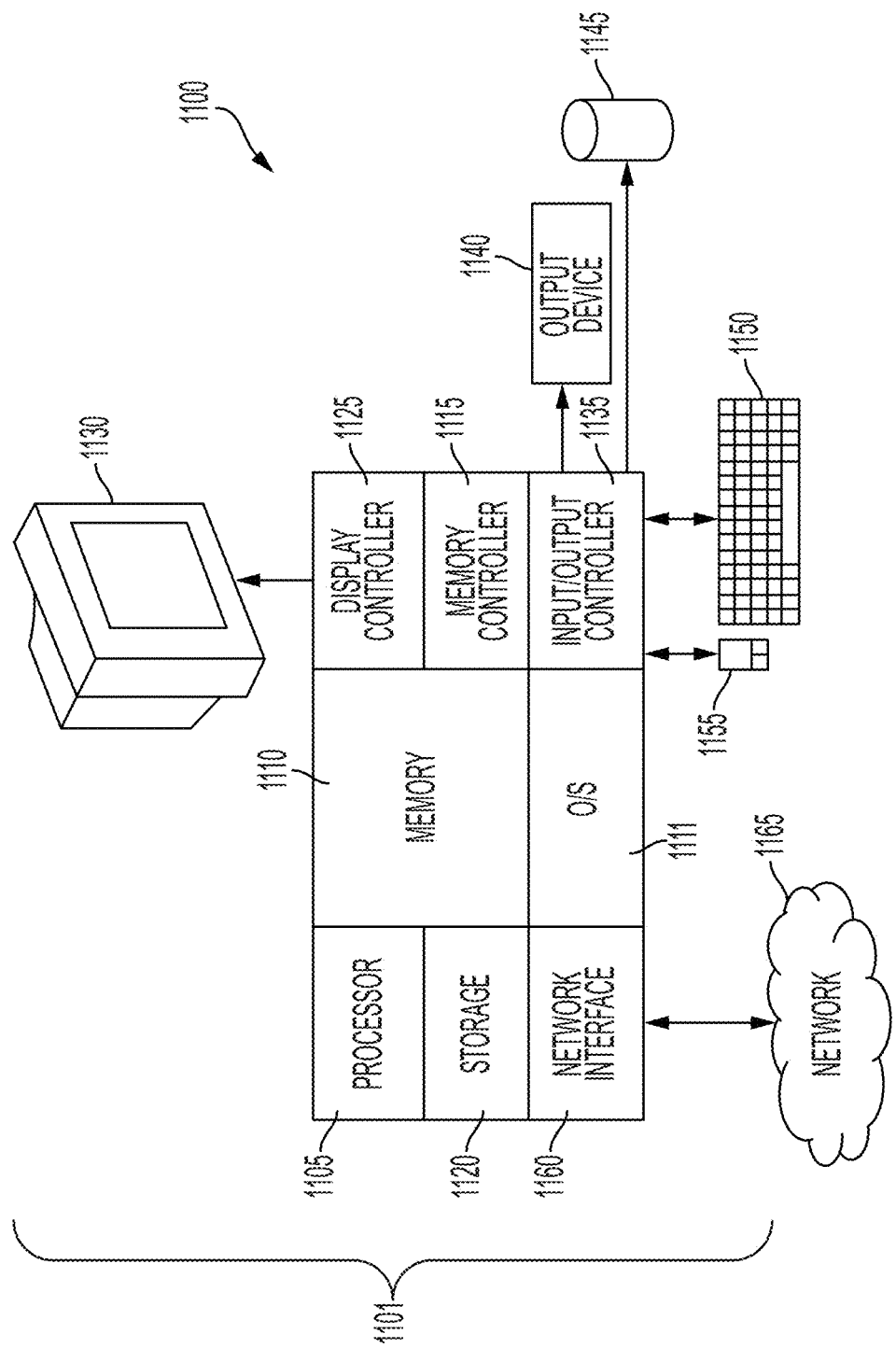
FIG. 11 illustrates a system for buffer overflow trapping according to one or more embodiments of the present invention.

Turning now to FIG. 11, a computer system for buffer overflow trapping is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 1100 therefore may include general-purpose computer or mainframe 1101 capable of running multiple instances of an O/S simultaneously.

In one or more exemplary embodiments of the present invention, in terms of hardware architecture, as shown in FIG. 11, the computer 1101 includes one or more processors 1105, memory 1110 coupled to a memory controller 1115, and one or more input and/or output (I/O) devices 1140, 1145 (or peripherals) that are communicatively coupled via a local input/output controller 1135. The input/output controller 1135 can be, for example but not limited to, one or more buses or other wired or wireless connections, as is known in the art. The input/output controller 1135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 1135 may include a plurality of sub-channels configured to access the output devices 1140 and 1145. The sub-channels may include fiber-optic communications ports.

The processor 1105 is a hardware device for executing software, particularly that stored in storage 1120, such as cache storage, or memory 1110. The processor 1105 can be any custom made or commercially available processor, a central processing unit (CPU), an auxiliary processor among several processors associated with the computer 1101, a semiconductor based microprocessor (in the form of a microchip or chip set), a macroprocessor, or generally any device for executing instructions.

The memory 1110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1110 may incorporate electronic, magnetic, optical, and/or other types of storage media. Note that the memory 1110 can have a distributed architecture, where various components are situated remote from one another, but can be accessed by the processor 1105.

The instructions in memory 1110 may include one or more separate programs, each of which comprises an ordered listing of executable instructions for implementing logical functions. In the example of FIG. 11, the instructions in the memory 1110 a suitable operating system (OS) 1111. The operating system 1111 essentially controls the execution of other computer programs and provides scheduling, input-output control, file and data management, memory management, and communication control and related services.

In accordance with one or more embodiments of the present invention, the memory 1110 may include multiple logical partitions (LPARs) each running an instance of an operating system. The LPARs may be managed by a hypervisor, which may be a program stored in memory 1110 and executed by the processor 1105.

In one or more exemplary embodiments of the present invention, a conventional keyboard 1150 and mouse 1155 can be coupled to the input/output controller 1135. Other output devices such as the I/O devices 1140, 1145 may include input devices, for example but not limited to a printer, a scanner, microphone, and the like. Finally, the I/O devices 1140, 1145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1100 can further include a display controller 1125 coupled to a display 1130.

In one or more exemplary embodiments of the present invention, the system 1100 can further include a network interface 1160 for coupling to a network 1165. The network 1165 can be an IP-based network for communication between the computer 1101 and any external server, client and the like via a broadband connection. The network 1165 transmits and receives data between the computer 1101 and external systems. In an exemplary embodiment, network 1165 can be a managed IP network administered by a service provider. The network 1165 may be implemented in a wireless fashion, e.g., using wireless protocols and technologies, such as WiFi, WiMax, etc. The network 1165 can also be a packet-switched network such as a local area network, wide area network, metropolitan area network, Internet network, or other similar type of network environment. The network 1165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1101 is a PC, workstation, intelligent device or the like, the instructions in the memory 1110 may further include a basic input output system (BIOS) (omitted for simplicity). The BIOS is a set of essential software routines that initialize and test hardware at startup, start the OS 1111, and support the transfer of data among the hardware devices. The BIOS is stored in ROM so that the BIOS can be executed when the computer 1101 is activated.

When the computer 1101 is in operation, the processor 1105 is configured to execute instructions stored within the memory 1110, to communicate data to and from the memory 1110, and to generally control operations of the computer 1101 pursuant to the instructions. In accordance with one or more embodiments of the present invention, computer 1101 is an example of a cloud computing node 10 of FIG. 9.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
receiving an error code describing a computer hardware or firmware error;
receiving a list of data items to be collected to assist in correcting the error, the contents of the list selected based at least in part on the error code, and the contents of the list in priority order from a highest priority data item to a lowest priority data item;
collecting the data items in the list;
selecting a buffer to store the collected data items; and
transmitting at least a subset of the collected data items to be written to the buffer, wherein all of the collected data items are transmitted to the buffer when the buffer is large enough to hold all of the data items in the list, and a subset of the collected data items are transmitted to the buffer in priority order starting with the highest priority data item when the buffer is not large enough to hold all of the data in the list.

2. The method of claim 1, wherein building a list of data items to be collected comprises:
accessing a logging table corresponding to the error, the logging table comprising a plurality of entries in priority order, each entry pointing to one selected from the group consisting of another logging table, a data item, and a firmware function that returns a data item, the accessing following the priority order to build the list of data items.

3. The method of claim 1, wherein the list is organized as a linked list.

4. The method of claim 1, wherein an amount of storage space required to hold the data items in the list is determined based on the error code and the selecting a buffer is based at least in part on the amount of storage space required to hold the data items in the list.

5. The method of claim 1, wherein the buffer is selected from a pool of buffers having a variety of sizes and the buffer is the largest buffer available in the pool of buffers.

6. The method of claim 5, where the buffer is not large enough to hold all of the data in the list.

7. The method of claim 6, wherein multiple buffers are selected to store the collected data items.

8. The method of claim 1, wherein the buffer is selected from a pool of buffers having a variety of sizes and the buffer is the smallest buffer available in the pool of buffers that can hold all of the data items in the list.

9. The method of claim 1, wherein the buffer is located on a remote system and the method further comprises subsequent to the selecting, determining that the remote system is currently unavailable and queuing the collected data until the remote system becomes available, wherein the selecting is performed subsequent to the remote system becoming available.

10. A system comprising:
one or more processors for executing computer readable instructions, the computer readable instructions controlling the one or more processors to perform operations comprising:
receiving an error code describing a computer hardware or firmware error;
receiving a list of data items to be collected to assist in correcting the error, the contents of the list selected based at least in part on the error code, and the contents of the list in priority order from a highest priority data item to a lowest priority data item;
collecting the data items in the list;
selecting a buffer to store the collected data items; and
transmitting at least a subset of the collected data items to be written to the buffer, wherein all of the collected data items are transmitted to the buffer when the buffer is large enough to hold all of the data items in the list, and a subset of the collected data items are transmitted to the buffer in priority order starting with the highest priority data item when the buffer is not large enough to hold all of the data in the list.

11. The system of claim 10, wherein building a list of data items to be collected comprises:
accessing a logging table corresponding to the error, the logging table comprising a plurality of entries in priority order, each entry pointing to one selected from the group consisting of another logging table, a data item, and a firmware function that returns a data item, the accessing following the priority order to build the list of data items.

12. The system of claim 10, wherein an amount of storage space required to hold the data items in the list is determined based on the error code and the selecting a buffer is based at least in part on the amount of storage space required to hold the data items in the list.

13. The system of claim 10, wherein the buffer is selected from a pool of buffers having a variety of sizes and the buffer is the largest buffer available in the pool of buffers.

14. The system of claim 13, where the buffer is not large enough to hold all of the data in the list.

15. The system of claim 14, wherein multiple buffers are selected to store the collected data items.

16. The system of claim 10, wherein the buffer is selected from a pool of buffers having a variety of sizes and the buffer is the smallest buffer available in the pool of buffers that can hold all of the data items in the list.

17. The system of claim 10, wherein the buffer is located on a remote system and the operations further comprise, subsequent to the selecting, determining that the remote system is currently unavailable and queuing the collected data until the remote system becomes available, wherein the selecting is performed subsequent to the remote system becoming available.

18. A computer program product comprising a computer readable storage medium having program instructions embodied therewith, the program instructions executable by a processor to cause the processor to perform operations comprising:
receiving an error code describing a computer hardware or firmware error;
receiving a list of data items to be collected to assist in correcting the error, the contents of the list selected based at least in part on the error code, and the contents of the list in priority order from a highest priority data item to a lowest priority data item;
collecting the data items in the list;
selecting a buffer to store the collected data items; and
transmitting at least a subset of the collected data items to be written to the buffer, wherein all of the collected data items are transmitted to the buffer when the buffer is large enough to hold all of the data items in the list, and a subset of the collected data items are transmitted to the buffer in priority order starting with the highest priority data item when the buffer is not large enough to hold all of the data in the list.

19. The computer program product of claim 18, wherein building a list of data items to be collected comprises:
accessing a logging table corresponding to the error, the logging table comprising a plurality of entries in priority order, each entry pointing to one selected from the group consisting of another logging table, a data item, and a firmware function that returns a data item, the accessing following the priority order to build the list of data items.

20. The computer program product of claim 18, wherein the buffer is located on a remote system and the operations further comprise, subsequent to the selecting, determining that the remote system is currently unavailable and queuing the collected data until the remote system becomes available.

\* \* \* \* \*